United States Patent
Lee

[11] 3,905,013
[45] Sept. 9, 1975

[54] HEADLIGHT WARNING SYSTEM

[76] Inventor: Maw-Huei Lee, 251 Tenth St., N.W., Apt. 80, Bldg. 8, Atlanta, Ga. 30318

[22] Filed: Apr. 27, 1973

[21] Appl. No.: 354,934

[52] U.S. Cl.......... 340/52 D; 337/50 R; 337/75 A; 337/258 F
[51] Int. Cl.................................. B60q 1/00
[58] Field of Search.......... 340/52 R, 52 D, 74, 248, 340/256; 339/258 F, 50 R, 95 A, , 257

[56] References Cited
UNITED STATES PATENTS

| | | | |
|---|---|---|---|
| 3,275,736 | 9/1966 | Hotine et al. | 339/95 A |
| 3,283,299 | 11/1966 | Savino | 340/52 D |
| 3,328,577 | 6/1967 | Pistey et al. | 339/50 R |
| 3,478,307 | 11/1969 | Testo | 339/258 F |
| 3,622,954 | 11/1971 | Hovnanian et al. | 339/95 A |
| 3,649,960 | 3/1972 | Severn | 340/52 D |

*Primary Examiner*—Marshall M. Curtis
*Attorney, Agent, or Firm*—B. J. Powell

[57] ABSTRACT

A headlight warning system controlled from the fuse block of a vehicle which is connected to the vehicle and powered from the headlight switch controlled dimmer switch to produce an audible warning signal when the headlight switch is closed and the ignition switch is open. The system uses a transistor with its base connected to the fuse block and its emitter connected to the dimmer switch, and a buzzer unit responsive to conduction of the transistor to generate an audible warning signal.

4 Claims, 6 Drawing Figures

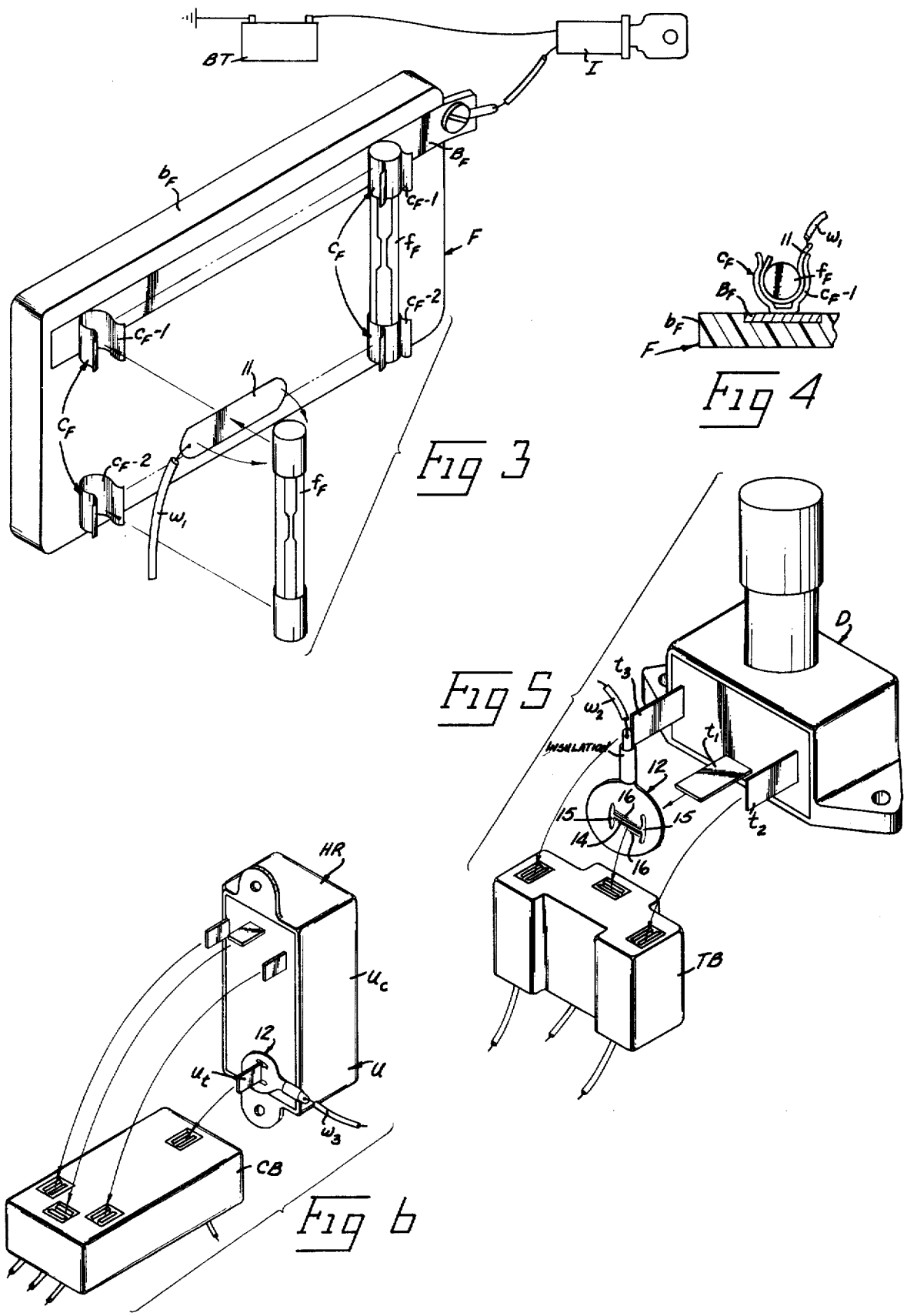

HEADLIGHT WARNING SYSTEM

BACKGROUND OF THE INVENTION

Many times drivers inadvertently leave their automobile headlights switched on when they leave the vehicle. Because the headlights are connected directly to the battery independently of the ignition switch, the power in the battery is expended if the automobile is unattended for any substantial period of time. This causes the driver to be unable to start the vehicle upon his return thereby necessitating expenses in starting the vehicle from an outside power source and recharging the battery. Some automotive manufacturers are adding an automatic headlight switch circuit which disables the headlights a predetermined period of time after the ignition switch has been turned off, however, such circuits are relatively expensive and are available on only a relatively few vehicles. While a few separately manufactured warning systems are available, the location and arrangement of the circuits in the vehicle makes it very difficult to install such a headlight warning system once the original manufacture of the vehicle is complete.

SUMMARY OF THE INVENTION

These and other problems and disadvantages are overcome by the invention disclosed herein by providing an alarm which notifies the driver of a vehicle when the headlight are inadvertently switched on, which is inexpensive, which can be easily installed on the vehicle without any tools by the owner, and which does not affect the operation of the original circuitry associated with the headlights of the vehicle. Moreover, the invention can be easily installed on the vehicle even after the original manufacture thereof without affecting the operation of the existing circuitry of the vehicle.

The apparatus of the invention includes transister means which is connected to the existing fuse block of the vehicle and to the existing light dimmer switch of the vehicle. The output of the transister is connected to a buzzer unit so that the buzzer unit is activated when the headlights are turned on but the ignition is off.

These and other features and advantages of the invention disclosed herein will become more fully understood upon consideration of the following specification and accompanying drawings wherein like characters of reference designate corresponding parts throughout the several views and in which:

BRIEF DESCRIPTION OF THE DRAWINGS

FIG. 3 is an exploded perspective view illustrating the connection of the invention to the existing fuse block of a vehicle;

FIG. 4 is a partial end view of the fuse block connection of FIG. 3;

FIG. 5 is an exploded perspective view illustrating the connection of the invention to the existing light dimmer switch of a vehicle; and, FIG. 6 is an exploded perspective view illustrating the connection of the invention to an existing buzzer unit of a vehicle.

Figure 1:
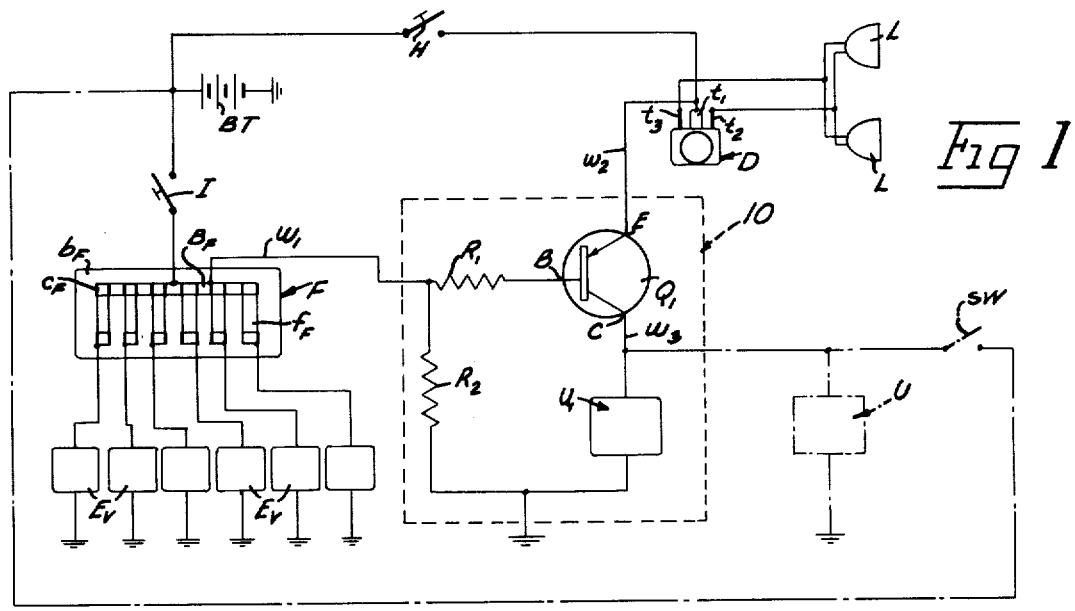
FIG. 1 is an electrical schematic diagram illustrating one embodiment of the invention.

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Referring to the drawings, it will be seen that the invention makes use of the existing fuse block F and headlight dimmer switch D of a vehicle. Also, it will be noted that use may be made of an existing buzzer unit U if it is available in the vehicle.

Referring now to FIG. 1 which illustrates schematically the first embodiment of the invention, the warning unit 10 includes generally a transistor $Q_1$ having its emitter E connected to the foot operated headlight dimmer switch D, its base B connected to the fuse block F through a resistor $R_1$, and its collector C connected to a buzzer unit $U_1$ as will become more apparent. The transistor $Q_1$ is of the pnp type which conducts when the potential at its emitter E is a predetermined amount (usually 0.2–0.6 volt) greater than the potential at its base B. The base B is connected to that portion of the fuse block F which is powered from the existing vehicle battery BT through the existing ingition switch I of the vehicle. Thus, when the ignition switch I is closed, the potential at the base B of transistor $Q_1$ is equal to that of the battery BT but when the ignition switch I is open, no voltage is supplied to base B. The emitter E of transistor $Q_1$ is connected to the dimmer switch D so that voltage is supplied to the emitter E when the existing headlight switch H is closed but not when it is open. The collector C of transistor $Q_1$ is connected directly to the hot side of the buzzer unit $U_1$ while the ground side of unit $U_1$ is connected directly to ground, normally the metal body of the vehicle.

A bias resistor $R_2$ is connected between the common point between resistor $R_1$ and the fuse block F and ground, again normally the metal body of the vehicle. The resistor $R_1$ is used as a current limiting device to prevent damage to the transistor $Q_1$ when the headlights are powered but the ignition switch I is open as will become more apparent. The bias resistor $R_2$ is used to provide the necessary bias to make transistor $Q_1$ conduct and is sufficiently large to prevent excess power drain from battery BT when the ignition switch I is closed.

Referring now to FIGS. 3 and 4, a representative existing fuse block F is illustrated. The block F includes a mounting base $b_F$ onto which a series of pairs of spring contacts $c_F$ are positioned. One contact $c_F$-1 of each pair is connected to the vehicle battery BF through the ignition switch I via a common bus $B_F$. Fuses $f_F$ are slipped into position between the contacts $c_F$ to fuse equipment $E_r$ individually connected to the other contacts $C_F$-2. This allows the equipment E to be operated only while the ignition switch I is closed.

The wire $w_1$ seen in FIG. 1 connected to resistors $R_1$ and $R_2$ is connected to any of the contacts $C_F$ that are connected to the battery BF by the ignition switch I. An adapter 11 is provided on the end of wire $w_1$ for use in connecting same to the contact $c_F$. The adapter 11 is a thin strip of electrically conductive material such as brass which can be easily bent partly around the contact on the fuse $f_F$ and the fuse $f_F$ with the adapter 11 slipped back into position between a pair of the contacts $c_F$ as seen in FIG. 4 without interfering with the operation of the equipment $E_r$ powered through the fuse $f_F$. This causes a voltage to be applied to the base B of transistor $Q_1$ when the ignition switch I is closed.

Referring to FIG. 5, a representative existing, foot-operated dimmer switch D is illustrated. Switch D has three blade type terminals $t_1$, $t_2$, and $t_3$. The middle terminal $t_1$ is normally the common terminal which is connected to the battery BT through the headlight switch H. The side terminals $t_2$ and $t_3$ are normally connected to the high and low beam inputs respectively of the headlights L. Switch D is effective in a first condition to connect terminal $t_1$ with terminal $t_2$ and effective in a second condition to connect terminal $t_1$ with terminal $t_3$.

The wire $w_2$ seen in FIG. 1 connected to the emitter E of transistor $Q_1$ is connected to the common terminal $t_1$ of dimmer switch D. A connector 12 is provided on the end of wire $w_2$ for use in connecting same to the terminal $t_1$. The connector 12 is a resilient plate of a conducting material such as brass that has been slit at 14 in a first direction and cross-slotted at 15 on each end of the slit 14 to form a pair of resilient tongues 16. The connector 12 is positioned on the common terminal $t_1$ of switch D by forcing the terminal $t_1$ through slit 14. The resiliency of tongues 16 is such that the connector 12 will be held on terminal $t_1$ and the terminals $t_1$-$t_3$ can be reinserted in the existing terminal block TB without the connector 12 interfering with the operation thereof.

The buzzer unit $U_1$ is of known construction that is electrically operated to produce an audible warning signal. If a buzzer unit U is already available on the vehicle and has its hot side connected to the vehicle battery BT through an appropriate signal switch SW usually forming a part of the ignition switch as shown by phantom lines in FIG. 1, then, the buzzer unit $U_1$ can be eliminated and the collector C of transistor $T_1$ connected directly to the hot side of buzzer unit U. Of course, the ground side of buzzer unit U is connected to ground.

Referring to FIG. 6, a representative existing buzzer unit U is illustrated. The particular unit U is combined with the horn relay HR, however, the operation of horn relay HR is completely independent of the buzzer unit U. Therefore, only the buzzer unit U will be discussed. The unit U illustrated is grounded to the vehicle body through the case $u_c$ and has a hot terminal $u_t$ which is connected to the battery BT through the switch SW. The connection of the collector C of transistor $Q_1$ to terminal $u_t$ is made by wire $w_3$ to which a connector 12 is attached. The connector 12 is positioned onto terminal $u_t$ in the same manner as that described for dimmer switch D and the buzzer unit U replaced in its connector block CB without interfering with the operation thereof.

In operation, it will be seen that when the ignition switch I is closed, voltage is applied to the base B of transistor $Q_1$. When the headlight switch H is closed, voltage is applied to the emitter E of transistor $Q_1$. Because transistor $Q_1$ will only conduct when the voltage at emitter E is high and the voltage at base B is low, transistor $Q_1$ will not conduct to energize buzzer unit $U_1$ or U when the ignition switch I is closed. Further, transistor $Q_1$ will not conduct when the headlight switch H is open. When headlight switch H is closed and ignition switch I is open, transistor $Q_1$ will conduct to energize buzzer unit $U_1$ or U to produce the desired audible signal to prevent the headlights from being advertently left in an "on" position.

While the values of the components may be changed, the following components operate satisfactorily.

| Component | Identification |
| --- | --- |
| Transistor $Q_1$ | MPS 6562 (Motorola) |
| Resistor $R_1$ | 1K ohm |
| Resistor $R_2$ | 1K ohm |
| Buzzer Unit $U_1$ | Archer Cat. No. 273-051 |

Figure 2:
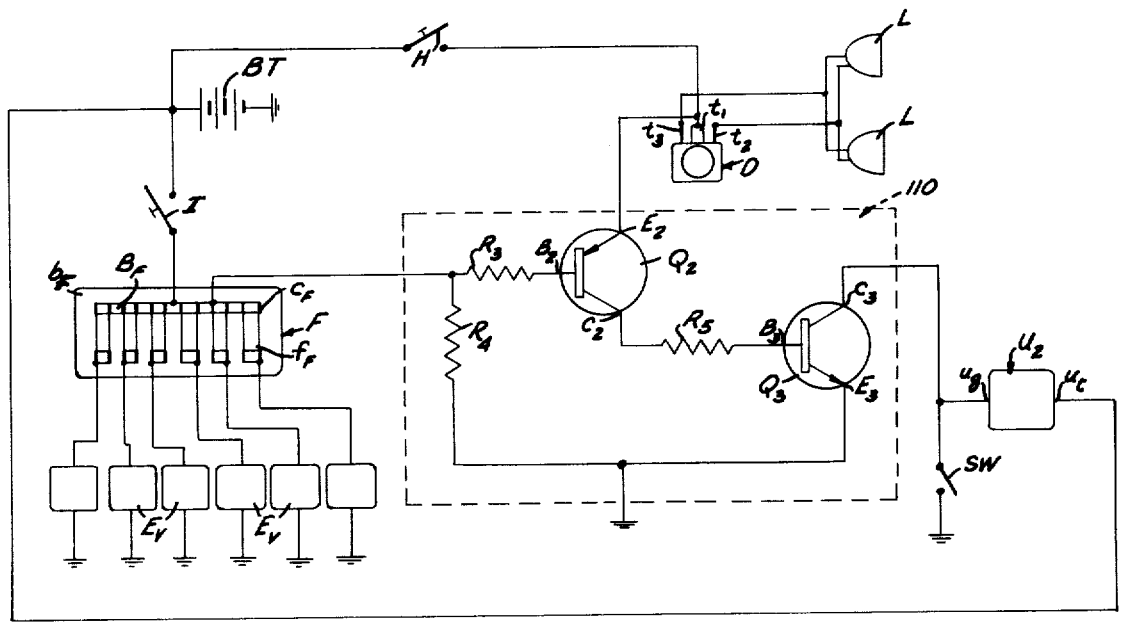
FIG. 2 is an electrical schematic diagram illustrating an alternate embodiment of the invention.

A second embodiment of the invention is illustrated in FIG. 2 and is designated generally by the numeral 110. The unit 110 is adapted for use with vehicles which have an existing buzzer unit $U_2$ that has its hot side connected directly to the battery BT and its ground side grounded through the signal switch SW. Of course, the vehicle has the ignition switch I, the dimmer switch D, headlight switch H, headlights L, and fuse block F.

Unit 110 includes a pnp transistor $Q_2$ with its base $B_2$ connected through resistor $R_3$ to the ignition switch activated contacts $c_F$ on fuse block F as disclosed for unit 10. The emitter $E_2$ of transistor $Q_2$ is connected to the common hot terminal $t_1$ of dimmer switch D as disclosed for unit 10. A resistor $R_4$ is connected between the common point between resistor $R_3$ and fuse block F and ground, usually the metal body of the vehicle. An npn transistor $Q_3$ has its base $B_3$ connected to the collector $C_2$ of transistor $Q_2$ through a resistor $R_5$ and its emitter $E_3$ connected to ground. The collector $C_3$ of transistor $Q_3$ is connected to the ground side of buzzer unit $U_2$. The buzzer unit $U_2$ is similar to the unit U illustrated except that it also has a grounded terminal $u_g$ in addition to its hot terminal $u_t$. The connector 12 is used to connect the collector $C_3$ to the grounded terminal $u_g$ rather than the hot terminal $u_t$.

The transistor $Q_2$, like transistor $Q_1$, conducts when the voltage at its emitter $E_2$ is high and the voltage at its base $B_2$ is low. Transistor $Q_3$ on the other hand, conducts when the voltage at its collector $C_3$ is high and the voltage at its base $B_3$ is also high. Thus, transistor $Q_2$ will conduct to make the voltage at base $B_3$ high only when the headlight switch H is closed and the ignition switch I is open. Since the voltage at the collector $C_3$ of transistor $Q_3$ is always high, transistor $Q_3$ will conduct when transistor $Q_2$ conducts to connect the ground side of buzzer unit $U_2$ to ground to energize same and produce the desired audible warning signal.

The resistor $R_3$ is used as a current limiting device to prevent damage to transistor $Q_2$ when the headlights are powered but the ignition switch I is open. The resistor $R_4$ is used to provide the necessary bias to make transistor $Q_2$ conduct and is sufficiently large to prevent excess power drain from battery BT when the ignition switch I is closed. The resistor $R_5$ is used to limit the current flowing through transistor $Q_2$ and to provide the necessary bias to cause transistor $Q_3$ to conduct when transistor $Q_2$ is conducting.

While the values of the components may be changed, the following components operate satisfactorily.

| Component | Identification |
| --- | --- |
| Transistor $Q_2$ | MPS 6562 (Motorola) |

-Continued

| Component | Identification |
| --- | --- |
| Transistor $Q_1$ | MPS 6561 (Motorola) |
| Resistor $R_1$ | 1 K ohm |
| Resistor $R_1$ | 1 k ohm |
| Resistor $R_3$ | 2.2 K ohm |

Because the fuse block F is powered when the ignition switch I is in its "ON" position and in its "ACCESSORY" position, the accessory position can be used if it is desirable to leave the headlights on but the ignition off without the buzzer unit U, $U_1$ or $U_2$ sounding. Also, on some vehicles, some of the contacts $c_F$ of the fuse block F are always powered while the rest of the contacts $c_F$ are connected to the vehicle battery through the ignition switch I. A simple way to check to see if the adapter 11 is connected to those contacts $c_F$ controlled by switch I is to install the adapter 11 and unit 10 or 110, close the headlight switch H, and open the switch I. If the buzzer unit U, $U_1$ or $U_2$ sounds, the connection is correct. If the buzzer unit does not sound, then the adapter 11 can be changed to other contacts $c_F$ on the fuse block F until the buzzer sounds.

It is to be understood that full use may be made of modifications, substitutions and equivalents without departing from the scope of the invention disclosed herein.

I claim:

1. A headlight warning apparatus for use on a vehicle having a first circuit controlled by an ignition switch and a headlight switch for controlling the operation of the headlights through a second circuit independently of the ignition switch comprising:
   signal means having a hot terminal and a ground terminal directly electrically grounded for generating a warning signal upon receipt of an electrical voltage at said hot terminal; and,
   a control means having a first input; a second input; and an output, said first input operatively connected to the first circuit so as to have voltage supplied thereto only when the ignition switch is closed; said second input operatively connected to the second circuit so as to have voltage supplied thereto only when the headlight switch is closed, and said output operatively connected to said hot terminal on said signal means; said control means constructed and arranged to cause the voltage imposed on said second input to be imposed on said output only when voltage is not supplied to said first input so that voltage will be supplied to said hot terminal of said signal means to generate a warning signal only when said headlight switch is closed to supply voltage to said second input and said ignition switch is open to not supply voltage to said first input.

2. The headlight warning apparatus of claim 1 wherein the first circuit includes a fuse block having at least one pair of spring contacts powered through the ignition switch and a fuse connecting the pair of contacts; wherein the second circuit includes a dimmer switch for controlling the output of the headlights having a common blade terminal powered through the headlight switch; and wherein said system further comprises an adapter electrically connected to said base of said transistor, said adapter including a thin strip of electrically conductive material bendable around said fuse and positionable between said fuse and one of said contacts while electrically connecting said contact with said fuse and said base; and, a connector electrically connected to the emitter of said transistor, said connector including a resilient plate defining a terminal receiving slit therein and including a resilient tongue on opposite sides of said slit, said slit adapted to slidably receive said blade terminal therethrough and said tongues adapted to maintain said connector onto said terminal.

3. A headlight warning apparatus for use on a vehicle having a first circuit controlled by an ignition switch and a headlight switch for controlling the operation of the headlights through a second circuit independently of the ignition switch comprising:
   signal means for generating a warning signal when an electrical voltage is imposed thereacross;
   a pnp type transistor having a base, an emitter, and collector, said emitter electrically connected to said second circuit so that voltage is supplied thereto when the headlight switch is closed and said collector connected to said signal means;
   a first resistor connecting said base of said transistor to said first circuit so that voltage is supplied to said base through said first resistor when the ignition switch is closed; and,
   a second resistor connecting the common point between said first resistor and said first circuit to electrical ground so that said emitter is electrically connected to said collector only when the ignition switch is open to cause a voltage to be imposed across said signal means if the headlight switch is closed.

4. A headlight warning apparatus for use on a vehicle having a first circuit selectively connected to a voltage source by an ignition switch and a headlight switch for selectively connecting the headlight to the voltage source through a second circuit independently of the ignition switch comprising:
   signal means having a hot terminal electrically connected to the voltage source and a ground terminal for generating a warning signal when said ground terminal is electrically grounded;
   a first pnp type transistor having a first base, a first emitter, and a first collector, said emitter electrically connected to said second circuit so that voltage is supplied thereto when the headlight switch is closed;
   a second npn type transistor having a second base, a second emitter, and a second collector, said second emitter electrically grounded and said second collector electrically connected to said ground terminal of said signal means;
   a first resistor electrically connecting said first base of said first transistor to said first circuit so that voltage is supplied to said first base through said first resistor when said ignition switch is closed;
   a second resistor connecting the common point between said first resistor and said first circuit to electrical ground;
   a third resistor electrically connecting said second base of said second transistor to said first collector of said first transistor so that said first transistor conducts only when the ignition switch is open to cause said second transistor to conduct if the headlight switch is closed to connect said ground terminal of said signal means to electrical ground.

* * * * *